(12) United States Patent
Wilkosz et al.

(10) Patent No.: US 11,960,540 B2
(45) Date of Patent: Apr. 16, 2024

(54) METHOD AND DEVICE FOR TAGGING INCIDENT DATA CAPTURED BY NON-PUBLIC-SAFETY AGENCY CONTROLLED CAMERAS

(71) Applicant: MOTOROLA SOLUTIONS, INC., Chicago, IL (US)

(72) Inventors: Pawel Wilkosz, Wisniowa (PL); Lukasz Osuch, Pszczyna (PL); Krzysztof Jasinski, Cracow (PL); Marcin Lukasik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/800,006

(22) PCT Filed: Jun. 19, 2020

(86) PCT No.: PCT/PL2020/050049
§ 371 (c)(1),
(2) Date: Aug. 16, 2022

(87) PCT Pub. No.: WO2021/256941
PCT Pub. Date: Dec. 23, 2021

(65) Prior Publication Data
US 2023/0104684 A1  Apr. 6, 2023

(51) Int. Cl.
*G06F 16/78* (2019.01)
*G06F 16/58* (2019.01)
(Continued)

(52) U.S. Cl.
CPC ...... *G06F 16/7867* (2019.01); *G06F 16/5866* (2019.01); *G06F 16/953* (2019.01);
(Continued)

(58) Field of Classification Search
CPC ............... G06F 16/7867; G06F 16/953; G06F 16/5866; G06F 16/787; G06F 16/908;
(Continued)

(56) References Cited

U.S. PATENT DOCUMENTS

| 7,801,328 B2 | 9/2010 | Au et al. |
| 8,483,654 B2 | 7/2013 | Levinson et al. |

(Continued)

FOREIGN PATENT DOCUMENTS

| KR | 20150092402 A | 8/2015 |
| WO | 2014063157 A2 | 4/2014 |
| WO | 2020046572 A1 | 3/2020 |

OTHER PUBLICATIONS

The International Search Report and the Written Opinion, corresponding patent application No. PCT/PL2020/050049, filed: Jun. 19, 2020, all pages.

*Primary Examiner* — Evan Aspinwall
(74) *Attorney, Agent, or Firm* — Raguraman Kumaresan

(57) ABSTRACT

A process for tagging incident data captured by non-public-safety agency controlled cameras. In operation, an electronic computing device detects an occurrence of an incident and obtains an incident identifier associated with the incident. The electronic computing device determines that a non-public-safety agency controlled camera is available for capturing incident data corresponding to the incident. The electronic computing device then controls a public-safety agency controlled internet-of-things (IoT) infrastructure deployed at an incident location to emit a signal including one of an audible signal, visible signal, or a combination of audible and visible signals to enable the non-public-safety agency controlled camera to tag incident data using the emitted signal. The electronic computing device links a unique tag representing the emitted signal to the incident identifier. The electronic computing device then searches the
(Continued)

incident data captured by the non-public-safety agency controlled camera using the unique tag representing the emitted signal.

18 Claims, 7 Drawing Sheets

(51) Int. Cl.
    *G06F 16/953* (2019.01)
    *G16Y 20/10* (2020.01)
    *G16Y 30/00* (2020.01)
    *G16Y 40/10* (2020.01)

(52) U.S. Cl.
    CPC .............. *G16Y 20/10* (2020.01); *G16Y 30/00* (2020.01); *G16Y 40/10* (2020.01)

(58) Field of Classification Search
    CPC .... G06F 16/285; G06F 16/55; G06F 16/7834; G06F 16/58; G16Y 20/10; G16Y 40/10; G16Y 30/00; G16Y 40/35; G08B 13/19663; G08B 13/19613; G08B 13/19671; G06V 20/47

USPC ......................................................... 707/705
    See application file for complete search history.

(56) References Cited

U.S. PATENT DOCUMENTS

| | | |
|---|---|---|
| 9,854,015 B2 | 12/2017 | Brewer et al. |
| 2010/0169786 A1 | 7/2010 | O'Brien et al. |
| 2012/0256745 A1 | 10/2012 | Piett et al. |
| 2014/0057590 A1 | 2/2014 | Romero |
| 2014/0169752 A1* | 6/2014 | May .................... G06F 16/7867 386/224 |
| 2017/0201867 A1 | 7/2017 | Mazzarella et al. |
| 2017/0263258 A1 | 9/2017 | Reitz et al. |
| 2017/0270630 A1 | 9/2017 | Creusen et al. |
| 2018/0343224 A1* | 11/2018 | Lord ................... H04N 21/2665 |
| 2019/0043351 A1* | 2/2019 | Yang .................. G06F 18/24133 |
| 2019/0310997 A1* | 10/2019 | Gratton ................. G06F 16/285 |
| 2019/0332607 A1* | 10/2019 | Leung .................. G06F 16/254 |
| 2019/0354629 A1* | 11/2019 | Zavesky ........... G06F 16/24575 |
| 2020/0265061 A1* | 8/2020 | Gratton ................ G06F 16/285 |

* cited by examiner

METHOD AND DEVICE FOR TAGGING INCIDENT DATA CAPTURED BY NON-PUBLIC-SAFETY AGENCY CONTROLLED CAMERAS

BACKGROUND

Mobile devices are now in common use by users. Large number of people currently carry a mobile device with them at all times. Most Mobile devices nowadays include a camera that is capable of capturing still images as well as full motion video. Moreover, mobile devices are also equipped with high speed wireless network functionality (e.g., long term evolution (LTE)) that allow users to upload or stream videos of events including public-safety incidents. Law enforcement agencies have also begun to track media uploaded in public websites to collect crucial evidence about ongoing and past incidents. However, since public websites are used to share information about a variety of topics, searching the media uploaded in such sites to find relevant incident information may be a challenge for law enforcement agencies.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
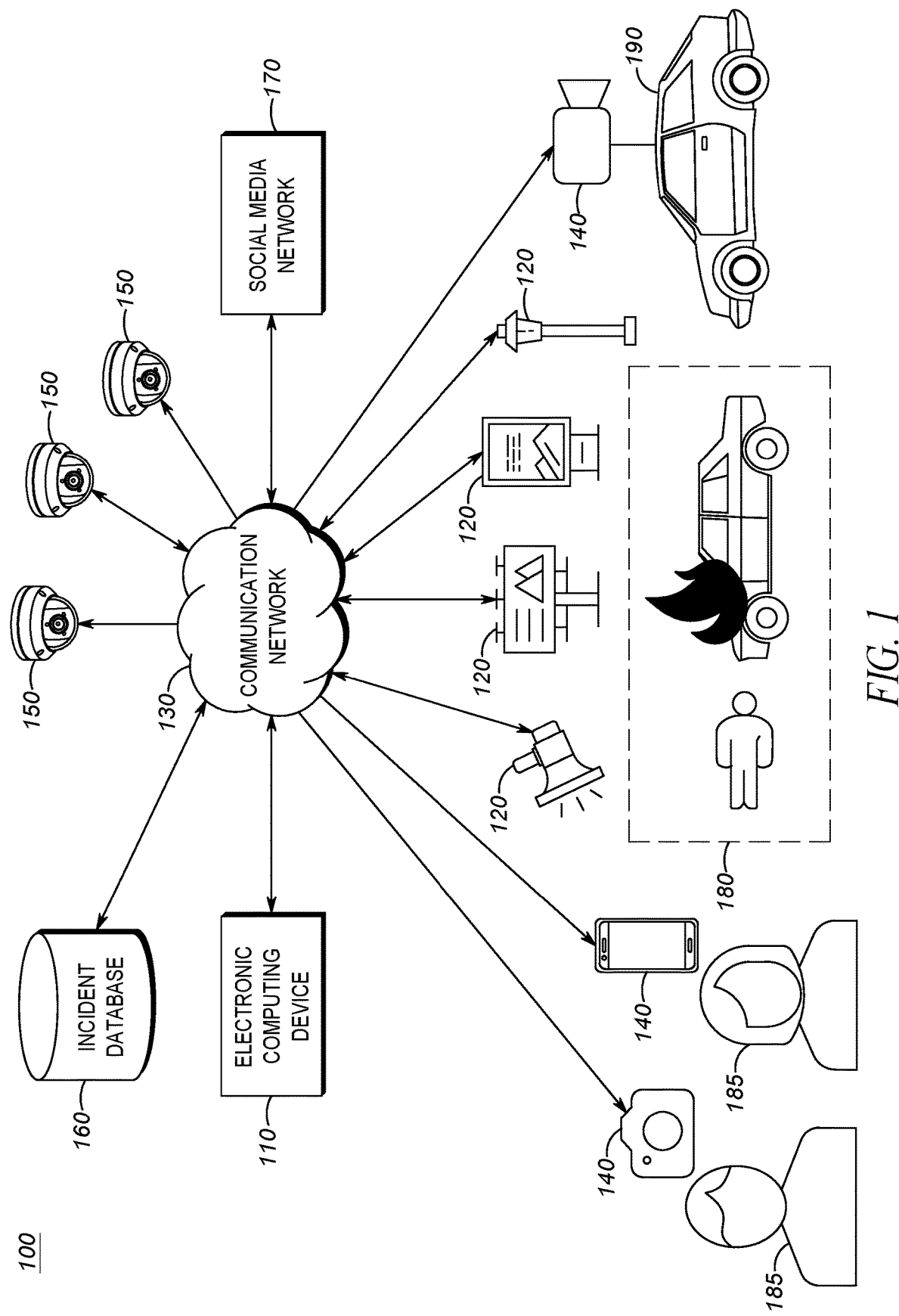
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In case of emergency incidents (e.g., a public-safety incident such as a fire incident), obtaining accurate information such as video footage of incidents in a timely manner is crucial for public-safety agencies. However, video footage may not be readily available to public-safety agencies when an incident location does not have any pre-deployed surveillance cameras that are owned, controlled, or operated by the public-safety agencies or alternatively when any cameras that are already positioned in or near the incident location do not have sufficient coverage or capability to capture the incident. Further, even if there are pre-deployed cameras that are available near the incident, such cameras may be owned, controlled, or operated by private entities, and therefore public-safety agencies may not have immediate permission to access and/or search video footage captured by privately owned, operated, or controlled cameras (collectively referred to as non-public-safety agency controlled cameras).

In some situations, it is possible to obtain video footage from private users who may have recorded the events of the incident using their camera-enabled mobile devices (i.e., non-public-safety agency controlled cameras). In this case, public-safety agencies may be able to search publicly accessible media (e.g., social media postings) to find video footage specifically captured from the incident location. However, an electronic search of publicly accessible media, for example, using a hashtag may also return media that may be irrelevant to the actual incident. Since hashtags are manually created, different users may be creating same or similar hashtags to tag social media content that may correspond to unrelated events or incidents. So, finding a relevant publicly accessible media using such hashtags created by non-public-safety agency users for tagging unrelated events may pose a challenge for public-safety agencies.

Disclosed is an improved process of tagging incident data captured by non-public-safety agency controlled cameras to enable public-safety agency users to search and process incident data captured by non-public-safety agencies in an efficient manner.

One embodiment provides a method of tagging incident data captured by non-public-safety agency controlled cameras. The method comprises: detecting, at an electronic computing device, an occurrence of an incident; obtaining, at the electronic computing device, an incident identifier associated with the incident; determining, at the electronic computing device, that at least one non-public-safety agency controlled camera is available for capturing incident data corresponding to the incident; identifying, at the electronic computing device, a public-safety agency controlled internet-of-things (IoT) infrastructure that is deployed at a location of the incident; controlling, at the electronic computing device, the public-safety agency controlled IoT infrastructure to emit a signal including one of an audible signal, visible signal, or a combination of audible and visible signals to enable the at least one non-public-safety agency controlled camera to tag incident data captured by the at least one non-public-safety agency controlled camera using the emitted signal; linking, at the electronic computing device, a unique tag representing the emitted signal to the incident identifier associated with the incident; and searching, at the electronic computing device, the incident data captured by the at least one non-public-safety agency controlled camera using the unique tag representing the emitted signal.

Another embodiment provides an electronic computing device including a transceiver and an electronic processor communicatively coupled to the transceiver. The electronic processor is configured to: detect an occurrence of an incident; obtain an incident identifier associated with the incident; determine that at least one non-public-safety agency controlled camera is available for capturing incident data corresponding to the incident; identify a public-safety agency controlled internet-of-things (IoT) infrastructure that is deployed at a location of the incident; control the public-safety agency controlled IoT infrastructure to emit a signal including one of an audible signal, visible signal, or a combination of audible and visible signals to enable the at least one non-public-safety agency controlled camera to tag incident data captured by the at least one non-public-safety agency controlled camera using the emitted signal; link a unique tag representing the emitted signal to the incident identifier associated with the incident; and search the incident data captured by the at least one non-public-safety agency controlled camera using the unique tag representing the emitted signal.

Each of the above-mentioned embodiments will be discussed in more detail below, starting with example system and device architectures of the system in which the embodiments may be practiced, followed by an illustration of processing blocks for achieving an improved technical method, device, and system for method of tagging incident data captured by non-public-safety agency controlled cameras. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence.

Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including an electronic computing device 110 communicatively coupled to a public-safety agency controlled internet-of-things (IoT) infrastructure 120 via a communication network 130. In some instances, the communications network 130 includes wireless and wired connections. For example, the communications network 130 may be implemented using a wide area network, such as the Internet, a local area network, such as a Wi-Fi network, and personal area or near-field networks, for example a Bluetooth™ network. Portions of the communications network 130 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof. In accordance with embodiments, the public-safety agency controlled IoT infrastructure 120 takes the form of a smart city infrastructure that is deployed for the purpose of managing city infrastructure services like transportation, traffic control, lighting control, building management, energy monitoring, pollution monitoring, public-safety, and community services. For example, the public-safety agency controlled IoT infrastructure 120 includes internet-of-things (IoT) devices that are integrated and/or attached to physical structures, devices, or equipment used for managing city infrastructure services such as street lights, electronic banners/billboards, traffic lights, loud speakers, public alert sirens, televisions, projectors, etc. In accordance with some embodiments, the electronic computing device 110 may take the form of a fixed or mobile computing device authorized by governmental agencies (e.g., fire department, police department, city department etc.,) to control the public-safety agency controlled IoT infrastructure 120 to emit visible and/or audible signals for tagging incident data (audio, image, or video) captured by non-public-safety agency controlled cameras 140. The non-public-safety agency controlled cameras 140 include camera-enabled mobile devices, portable cameras, and other data capturing devices and sensors that are typically carried and/or operated by users (for example, private/civilian users not associated with public-safety agencies) for their personal use.

In accordance with some embodiments, the electronic computing device 110 is communicatively coupled to emergency communication systems (e.g., 911 communication infrastructure including public-safety answering points (PSAPs)) to obtain real-time information related to incidents occurring in geographical areas served by the emergency communication systems. An incident may be the scene of a crime, fire, accident, medical emergency, natural disaster, or other public-safety incident. The incident scene may be captured by public-safety agency controlled cameras 150, for example, surveillance cameras, body-worn cameras, and other fixed or mobile cameras that are owned, controlled, or operated by the public-safety agencies. The public-safety agency controlled cameras 150 may capture audio, image, or video (collectively referred to as incident data) corresponding to the incident and may upload the incident data on an incident database 160. Public-safety agencies may access the incident data from the incident database 160 for evidentiary or investigatory purposes. In addition, public-safety agencies may also receive real-time streams of incident data such as video footage of the incident from the public-safety agency controlled cameras 150. However, in some situations, the public-safety agency controlled cameras 150 may not be available for and/or capable of recording incident data corresponding to an incident occurring at an incident location. In such situations, public-safety agencies (e.g., via the electronic computing device 110) may be able to search publicly accessible media (e.g., social media postings uploaded on social media networks 170) to check if incident data corresponding to a particular incident has been uploaded using tags that are generated based on visible and/or audible signals emitted by public-safety agency controlled IoT infrastructure 120 in accordance with the remainder of this disclosure.

An example incident scene 180 illustrating an explosion of a vehicle and an injured person at an incident location is shown in FIG. 1. Users 185 operating non-public-safety agency controlled cameras 140 (e.g., cameras-enabled mobile devices, portable cameras, etc.,) may be present at the incident location and further capturing the incident scene 180 using their respective cameras 140. Similarly, vehicles 190 integrated with non-public-safety agency controlled cameras 140 (e.g., dashboard or other vehicular type cameras) may be present at the incident scene and capturing the incident scene 180. When public-safety agency controlled cameras 150 are not available to capture the incident scene 180, the electronic computing device 110 determines the availability of one or more non-public-safety agency controlled cameras 140 to capture incident data including audio, image, or video corresponding to the incident scene 180. In order to facilitate the efficient search of incident data captured by non-public-safety agency controlled cameras 140, the electronic computing device 110 identifies a public-safety agency controlled IoT infrastructure 120 (e.g., a street light or a loudspeaker) that is deployed at a location of the incident and further controls the identified public-safety agency controlled IoT infrastructure 120 to emit one of audible, visible, or combination of audible and visible signals (collectively referred herein as an emitted signal). The electronic computing device 110 further links a unique tag or code representing the emitted signal to an incident identifier associated with the incident. The non-public-safety agency controlled cameras 140 that record the incident data may use the emitted signal to tag any incident data captured from the incident scene 180 and may further upload or stream the incident data on a public network such as a social media network 170. Tagging the incident data using the emitted signal allows public-safety agencies to efficiently search incident data corresponding to a particular incident using the unique tag linked to the incident identifier associated with the particular incident. In accordance with some embodiments, the electronic computing device 110 may receive a search query including an incident identifier from a public-safety agency user indicating a request to search for media related to a particular incident. In response, the electronic computing device searches for media publicly accessible on public networks such as the social media network 170 to retrieve, for example, a social media post to which the unique tag linked to the incident identifier is tagged. The electronic computing device 110 then provides a visual or audio output indicating the retrieved social media post to which the unique tag is tagged. Additionally, or alternatively, the electronic computing device 110 then uploads the social media post to which the unique tag is tagged to the incident database 160.

Figure 2:
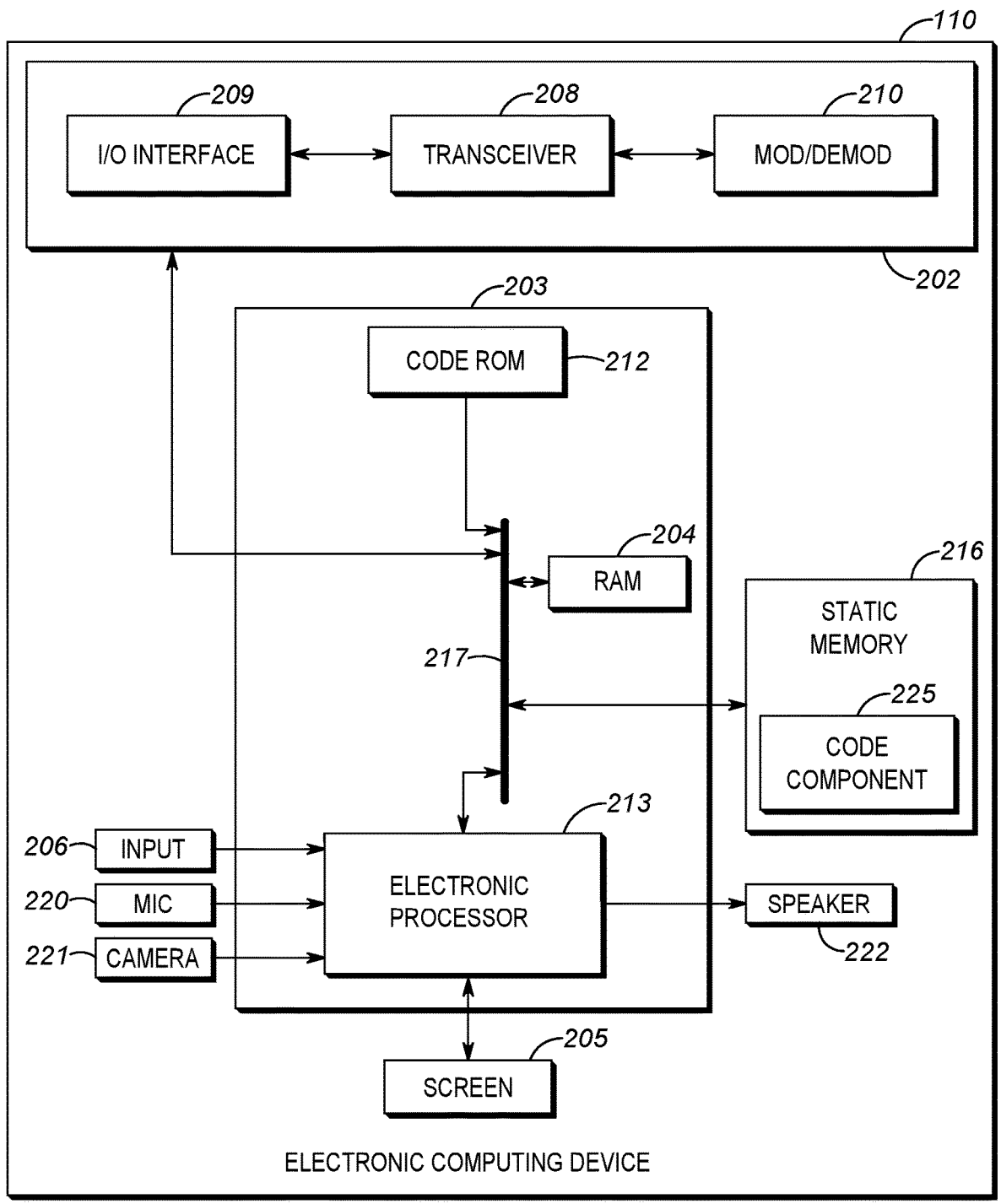
FIG. 2 is a block diagram of an electronic computing device shown in FIG. 1 in accordance with some embodiments.

FIG. 2 is an example functional block diagram of an electronic computing device operating within the communication system 100 in accordance with some embodiments. The electronic computing device performs the functions of the electronic computing device 110 shown in FIG. 1, and may be embodied in one or more communication devices or computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of electronic computing device 110, the electronic computing device 110 may include fewer or additional components in configurations different from that illustrated in FIG. 2. For example, in some embodiments, the electronic computing device 110 acting as an infrastructure controller or a server may not include one or more of the screen 205, microphone 220, camera 221 (which may be an external camera coupled to the infrastructure controller), and speaker 222. As another example, in some embodiments, the electronic computing device 110 may be a communication device (e.g., used by public-safety agency officers) that includes one or more of the screen 205, microphone 220, camera 221, and speaker 222. Other combinations are possible as well.

As shown in FIG. 2, the electronic computing device 110 includes a communications unit 202 coupled to a common data and address bus 217 of a processing unit 203. The electronic computing device 110 may also include one or more input devices 206, for example, keypad, pointing device, touch-sensitive surface, button, and the like. The electronic computing device 110 also includes a microphone 220, a camera 221, and an electronic display screen 205 (which, in some embodiments, may be a touch screen and thus also acts as an input device), each coupled to be in communication with the processing unit 203.

The camera 221 captures video corresponding to its field-of-view for further processing by the processing unit 203 and/or for further transmission as a video stream by the communications unit 202. A speaker 222 may be present for reproducing audio that is decoded from voice or audio streams of calls received via the communications unit 202 from other devices, from digital audio stored at the electronic computing device 110, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate, for example, with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The one or more electronic processors 213 has ports for coupling to the display screen 205, the microphone 220, the camera 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In accordance with some embodiments, the static memory 216 may have access to or otherwise temporarily or permanently store information included in the incident database 160. For example, the electronic computing device 110 may be configured to generate and store a unique incident identifier (e.g., a computer aided dispatch (CAD) identifier) associated with a particular incident at the static memory 216. The static memory 216 may also include a table or database linking a unique code representing an emitted signal (i.e., audible and/or visible signal emitted by the public-safety agency controlled IoT infrastructure 1200) to the incident identifier. Linking the unique code representing the emitted signal to the incident identifier allows users (e.g., public-safety agency officers) to search incident data captured by non-public-safety agency controlled cameras 140 corresponding to a particular incident to which the incident identifier is associated.

Figure 3:
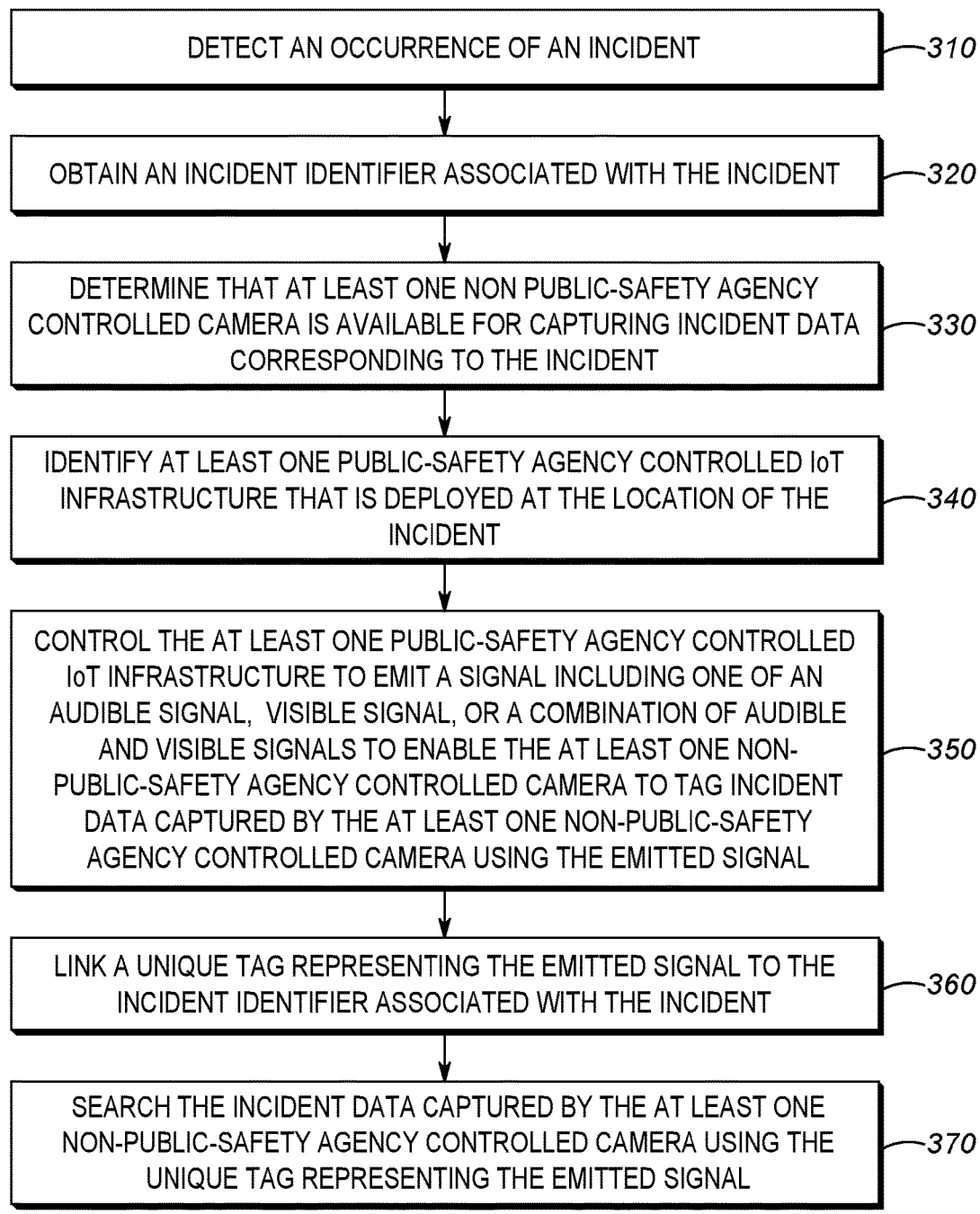
FIG. 3 illustrates a flowchart of a method of tagging incident data captured by non-public-safety agency controlled cameras in accordance with some embodiments.

Turning now to FIG. 3, a flowchart diagram illustrates a process 300 for operating an electronic computing device 110 to tag incident data captured by non-public-safety agency controlled cameras 140. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or electronic computing device 110 shown in FIG. 2, and embodied as a singular computing device or distributed computing device may execute process 300 via an electronic processor 213 implemented at the electronic computing device 110. The electronic computing device 110 may execute the process 300 at power-on, at some predetermined periodic time period thereafter, in response to a trigger raised locally at the device via an internal process or via an input interface or in response to a trigger from an accessory or an authorized external device to which the electronic computing device 110 is communicably coupled, among other possibilities.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

Process begins at block 310 when the electronic computing device 110 detects an occurrence of an incident. In one embodiment, the electronic computing device detects an occurrence of an incident based on obtaining real-time incident information related to occurrence of an incident from an emergency communication system such as 911 communication infrastructure. In one embodiment, the electronic computing device 110 monitors 911 emergency calls received at a public-safety answering point of the emergency communication system to automatically extract incident information and detect an occurrence of the incident. The incident information includes information such as type of incident, incident location, and information about specific person, object, or entity of interest corresponding to which audio, video, or image (i.e., incident data) needs to be captured from the incident location.

At block 320, the electronic computing device 110 obtains an incident identifier associated with an incident detected at block 310. The incident identifier may correspond to a computer aided dispatch (CAD) identifier generated by the emergency communication system and further received as part of the incident information from the emergency communication system. Alternatively, the electronic computing device 110 may locally generate and store a unique incident identifier to identify the incident detected at block 310.

At block 330, the electronic computing device 110 determines that at least one non-public-safety agency controlled camera 140 (see FIG. 1) is available for capturing incident data corresponding to the incident detected at block 310. In accordance with some embodiments, the electronic computing device 110 executes the function described in block 330 only after determining that a public-safety agency controlled camera 150 is not available or capable of capturing, storing, or tagging incident data corresponding to the detected incident. In these embodiments, the electronic computing device 110 stores and/or has access to a database that identifies a list of public-safety agency controlled cameras 150 and corresponding locations in which the public-safety agency controlled cameras 150 are deployed. The database may also include information related to the current capability of the cameras 150 in terms of available/total storage space, network/streaming capability, multimedia tagging capability, battery charge level, field-of-view information, resolution, etc. For example, the electronic computing device 110 may search this database to determine whether a public-safety agency controlled camera 150 is deployed at the location of the incident detected at block 310. Further, when the electronic computing device 110 determines that one or more public-safety agency controlled cameras 150 are deployed at the incident location, the electronic computing device 110 further determines whether the deployed public-safety agency controlled cameras 150 are capable of capturing, storing, or tagging incident data for evidentiary or investigatory purposes. For example, the electronic computing device 110 may determine that the public-safety agency controlled cameras 150 deployed at the incident location are not capable of capturing, storing or tagging the incident data for evidentiary or investigatory purposes when the public-safety agency controlled cameras 150 have a storage space lower than a predetermined storage space (i.e., storage space locally available at the cameras 150 are not sufficient for capturing and/or storing an audio, video, or image corresponding to the incident) or when the public-safety agency controlled cameras 150 have a battery charge level lower than a predetermined battery charge level (e.g., a body-worn camera operated by a public-safety agency officer may not have sufficient battery charge level).

The electronic computing device 110 may also determine that the public-safety agency controlled cameras 150 deployed at the incident location are not capable of capturing, storing or tagging the incident data for evidentiary or investigatory purposes when the public-safety agency controlled cameras 150 does not have a field-of-view to capture incident data, for example, an audio, video, or image of a specific person, object, or entity of interest that needs to be monitored at the incident scene. In some cases, the electronic computing device 110 may have adequate storage space, battery charge level, and field-of-view for capturing or storing the incident data corresponding to the detected incident, but may not have capability to digitally tag the captured incident data using visible and/or audible signals emitted by a public-safety agency controlled IoT infrastructure 120. For example, a public-safety agency controlled camera 150 deployed at the incident location may be an analog device that cannot digitally tag the captured incident data. Additionally, some public-safety agency controlled cameras 150 are not capable of recording video or images with high resolution. The video or images captured by such public-safety agency controlled cameras 150 may not meet the evidentiary standards and therefore the electronic computing device 110 may determine in this case that such public-safety agency controlled cameras 150 are not capable of capturing, storing, or tagging incident data corresponding to the detected incident.

Accordingly, when the electronic computing device 110 determines that public-safety agency controlled cameras 150 are not available or capable of capturing, storing, or tagging incident data corresponding to the detected incident, the electronic computing device 110 proceeds to block 330 to determine if there are non-public-safety agency controlled cameras 140 that are available for capturing incident data corresponding to the incident. In one embodiment, if the electronic computing device 110 determines that public-safety agency controlled cameras 150 are available at the location of the incident and further capable of capturing, storing, and tagging incident data corresponding the detected data, the electronic computing device 110 may refrain from performing the functions described at block 340 through 370 and instead relies on incident data captured by public-safety agency controlled cameras 150 already deployed at the location of the incident for evidentiary or investigatory purposes. In an alternative embodiment, if the electronic computing device 110 determines that public-safety agency controlled cameras 150 are available at the location of the incident and further capable of capturing, storing, and tagging incident data corresponding the detected data, the electronic computing device 110 may not refrain from performing the functions described at block 340 through 370, and instead the electronic computing device 110 processes incident data captured by both public-safety agency controlled cameras 150 and non-public-safety agency controlled cameras 140 for evidentiary or investigatory purposes.

Returning to block 330, the electronic computing device 110 determines that at least one non-public-safety agency controlled camera 140 is available for capturing the incident data based on the presence of a camera-enabled device in proximity to the incident location. In one embodiment, the electronic computing device 110 identifies access points (e.g., base stations, evolved node Bs (eNBs), wireless routers, WiFi access points, or any other type of infrastructure equipment interfacing with one or more wireless electronic devices) that are deployed within a predetermined geographical area from the location of the detected incident. Once the access points are detected, the electronic computing device 110 will determine whether there are devices that are currently (i.e., in real-time at the time of occurrence of the incident) associated with the identified access points. The electronic computing device 110 may contact service providers (e.g., cellular operators/internet service providers) or smart city infrastructure to identify access points and/or devices that are currently present at the incident location. In these embodiments, the electronic computing device 110 may obtain a list of device identifiers corresponding to the devices that are currently associated with the access points and may further request an appropriate service provider to confirm whether such devices currently present at the incident location are enabled with cameras. In response, the service providers may confirm whether the devices currently present at the location are enabled with cameras. Additionally, or alternatively, the electronic computing device 110 may receive information related to the type of devices currently present at the incident location. The type of devices may indicate the functionality of the devices present at the incident location. For example, if the type of device identified at the incident location is a smart mobile device, the electronic computing device 110 may automatically determine that the device is enabled with a camera and further capable of capturing, storing, and tagging audio, video, and image data corresponding to the incident. In other words, the electronic computing device 110 determines that the smart mobile device is capable of tagging incident data captured at the incident location using both audible and/or visible signals emitted from a public-safety agency controlled IoT infrastructure 120. As another example, if the type of device identified at the incident location is a video car recorder, the electronic computing device 110 may determine that the video car recorder is not capable of recording sounds from the incident location. In other words, in this example, the electronic computing device 110 determines that the video car recorder is capable of tagging incident data captured at the incident location using only visible signals (i.e., not audible signals) emitted from a public-safety agency controlled IoT infrastructure 120. In these embodiments, the service provider is authorized to share any information related to the devices present at the incident location only after receiving permission from the owners of the devices to share such information with the electronic computing device 110. The electronic computing device 110 may additionally or alternatively determine availability of non-public-safety agency controlled cameras 140 through other automatic or manual methods as well. For example, the electronic computing device 110 may obtain information related to the presence of users and/or civilians at the incident location from images or videos captured by public-safety agency controlled cameras 150 that may be deployed near the incident location. In this example, the public-safety agency controlled cameras 150 may not have direct field-of-view to a person, object, or entity of interest that needs to be captured from the incident location, but may have a field-of-view to a civilian user carrying a camera-enabled device and further proceeding in a direction toward the incident location.

Next, at block 340, the electronic computing device 110 identifies a public-safety agency controlled IoT infrastructure 120 that is deployed at the location of the incident. In one embodiment, the electronic computing device 110 obtains information related to a public-safety agency controlled IoT infrastructure 120 deployed at the incident location from a smart city controller. The smart city controller may be responsible for managing the IoT ecosystem comprising a hub of IoT devices deployed in a particular city/geographical area encompassing the incident location and may authorize the electronic computing device 110 associated with public-safety agencies to control one or more IoT devices (e.g., IoT devices integrated into public-safety agency controlled IoT infrastructure 120 such as streetlights and billboards) to emit audible and/or visible signals. In this embodiment, the electronic computing device 110 sends a request to the city controller to obtain information related to at least one public-safety agency controlled IoT infrastructure 120. The request includes authentication credentials of the electronic computing device 110 and incident location (e.g., address, GPS coordinates, building name, landmark etc.,). In response, the city controller authenticates the electronic computing device 110 using the authentication credentials to ensure that the electronic computing device 110 is authorized by a public-safety agency (e.g., police department) to control the public-safety agency controlled IoT infrastructure 120. After authenticating the electronic computing device 110, the city controller sends a response including a list of public-safety agency controlled IoT infrastructures 120 deployed at the incident location and an access token to enable the electronic computing device 110 to control one or more of the public-safety agency controlled IoT infrastructure 120 to emit audible and/or visible signals. The response may further identify the type of public-safety agency controlled IoT infrastructure 120 to enable the electronic computing device 110 to determine whether the public-safety agency controlled IoT infrastructure 120 is capable of emitting audible only signal, visible only signal, or both audible and visible signals. For example, if the list identifies the type of public-safety agency controlled IoT infrastructure 120 as a street light, the electronic computing device 110 determines that the street light is capable of emitting visible only signals via a corresponding lighting component attached to the street light. As another example, if the list identifies the type of infrastructure as a loudspeaker, the electronic computing device 110 determines that the loudspeaker is capable of emitting audible only signals via a corresponding speaker component attached to the loudspeaker. As another example, if the list identifies the type of infrastructure as a smart television, the electronic computing device 110 determines that the smart television is capable of emitting both audible and visible signals via a respective speaker and display components integrated into the smart television.

Next, at block 350, the electronic computing device 110 controls at least one public-safety agency controlled IoT infrastructure to emit a signal including one of an audible signal, visible signal, or a combination of audible and visible signals (collectively referred to as an emitted signal) to enable the at least one non-public-safety agency controlled camera 140 determined at block 330 to tag incident data captured by the at least one non-public-safety agency controlled camera 140 using the emitted signal. The electronic computing device 110 may select the at least one public-safety agency controlled IoT infrastructure 120 from the list of public-safety agency controlled IoT infrastructures received from the city controller based on a comparison between the types of public-safety agency controlled IoT infrastructures included in the list and the type of non-public-safety agency controlled camera 140 determined at block 330. For example, if the type of non-public-safety agency controlled camera 140 is a video car recorder, the electronic computing device 110 may determine that the video car recorder is not capable of recording sounds from the incident location. In other words, in this example, the electronic computing device 110 determines that the video car recorder is capable of tagging incident data captured at the incident location using visible only signals (i.e., not audible signals) emitted from a public-safety agency controlled IoT infrastructure 120. Accordingly, in this example, the electronic computing device 110 selects a public-safety agency controlled IoT infrastructure 120, for example, a street light or a billboard, that is capable of emitting a visible signal to enable the video recorder to tag an image or video captured corresponding to the incident using the visible signal. After selecting the public-safety agency controlled IoT infrastructure 120, the electronic computing device 110 controls the selected public-safety agency controlled IoT infrastructure 120 to emit one of the visible signal, audible signal, or combination of audible and visible signals to enable the non-public-safety agency controlled camera 140 to tag the incident data using the emitted signal.

In case the selected public-safety agency controlled IoT infrastructure 120, for example, a street light integrated with a lighting component or a billboard integrated with a display component, is capable of emitting visible only signals, the electronic computing device 110 controls the selected public-safety agency controlled IoT infrastructure 120 to emit a visible only signal for enabling the non-public-safety agency controlled camera 140 to tag the incident data using the visible only signal. In accordance with some embodiments, when the electronic computing device 110 selects a public-safety agency controlled IoT infrastructure 120 such as a street light integrated with a lighting component, the electronic computing device 110 transmits an instruction to the public-safety agency controlled IoT infrastructure 120 (i.e., to a IoT receiver associated with the street light/lighting component) to emit a visible signal including a predetermined sequence of light flashes via the lighting component. The instruction to the public-safety agency controlled IoT infrastructure 120 includes commands for controlling a predetermined set of lighting parameters (e.g., intensity, duration, color, type, lighting component's position or height from above the ground at which the light flashes should be emitted) for emitting the visible signal including the predetermined sequence of light flashes. Alternatively, when the electronic computing device 110 selects a public-safety agency controlled IoT infrastructure 120 such as a billboard, television, or any electronic appliance integrated with a display component, the electronic computing device 110 transmits an instruction to the public-safety agency controlled IoT infrastructure 120 (i.e., to an IoT receiver associated with the display component) to emit a visible signal by displaying a pre-generated image (e.g., a quick response (QR) code, barcode, shape patterns, a photo, a picture, an animation or short video clip etc.,) or text (e.g., a word including alphanumeric characters and/or symbols represented in hashtag format) via the display component. The instruction to the public-safety agency controlled IoT infrastructure 120 includes the pre-generated image or text that needs to be displayed via the display component at the public-safety agency controlled IoT infrastructure 120.

In another example, if the list of public-safety agency controlled IoT infrastructure 120 includes only IoT devices that are integrated with a speaker component (e.g., a loudspeaker), the electronic computing device 110 may control the public-safety agency controlled IoT infrastructure 120 to emit an audible signal. In accordance with some embodiments, the electronic computing device 110 transmits an instruction to the public-safety agency controlled IoT infrastructure to emit the audible signal including a predetermined sequence of audio tones via the speaker components. The instruction to the public-safety agency controlled IoT infrastructure 120 includes commands for controlling a predetermined set of audio parameters (e.g., type, intensity, duration, frequency, place of issue, recurrence etc., arranged for a given time duration) for emitting the audible signal including the predetermined sequence of audio tones.

In another example, when the non-public-safety agency controlled camera 140 determined at block 330 is a mobile device or a portable camera that is capable of recording both audio (i.e., via a microphone) and video (i.e., via a camera), the electronic computing device 110 selects a public-safety agency controlled IoT infrastructure 120 that is capable of emitting both audible and visible signals. In other words, in this case, the electronic computing device 110 selects a public-safety agency controlled IoT infrastructure 120 that is integrated with both display or lighting component and speaker component. The electronic computing device 110 further controls the selected public-safety agency controlled IoT infrastructure 120 to emit a combination of both audible and visible signals to enable the non-public-safety agency controlled camera 140 to tag incident data using both the audible and visible signals. In accordance with some embodiments, the electronic computing device 110 transmits an instruction to the selected public-safety agency controlled IoT infrastructure 120 to emit an audible signal including a predetermined sequence of audio tones via the speaker component and a visible signal including a predetermined sequence of light flashes or a pre-generated image or text. The instruction to the public-safety agency controlled IoT infrastructure 120 to emit a combination of audible and visible signals includes a first set of commands for controlling a predetermined set of audio parameters and a second set of commands for controlling a predetermined set of lighting parameters or for displaying the pre-generated image or text.

In accordance with some embodiments, the electronic computing device 110 transmits an access token received from the city controller along with the instruction transmitted to the public-safety agency controlled IoT infrastructure 120 to emit audible and/or visible signals. In response, the public-safety agency controlled IoT infrastructure 120 emits a corresponding audible and/or visible signal specified in the instruction only after verifying the validity of the access token received from the electronic computing device 110. When the access token received from the electronic computing device 110 is not valid, the public-safety agency controlled IoT infrastructure 120 refrains from emitting a corresponding audible and/or visible signal specified in the instruction. Accordingly, the access token enables the public-safety agency controlled IoT infrastructure 120 to be controlled only by an electronic computing device 110 previously authenticated by the city controller.

In one embodiment, the electronic computing device 110 may select a plurality of public-safety agency controlled IoT infrastructures 120 for emitting audible, visible, or combination of audible or visible signals to enable the non-public-safety agency controlled camera 140 to tag incident data using one or more of the emitted signals. For example, the electronic computing device 110 may control a first public-safety agency controlled IoT infrastructure 120 such as a street light to emit a visible signal including a predetermined sequence of light flashes, a second public-safety agency controlled IoT infrastructure 120 such as a billboard to emit a visible signal including a pre-generated image or text, and a third public-safety agency controlled IoT infrastructure 120 such as loudspeaker to emit an audible signal including a predetermined sequence of audio tones. In response, the non-public-safety agency controlled camera 140 present at the incident location may tag the incident data using one or more of the light flashes emitted by the street light, the pre-generated image or text displayed at the billboard, and the audio tones emitted by the loudspeaker.

In one embodiment, when the electronic computing device 110 determines that there is no pre-deployed public-safety agency controlled IoT infrastructure 120 available at the incident location, the electronic computing device 110 may signal one or more drones available for responding to the incident location. The electronic computing device 110 may control an available drone integrated with one of display, speaker, or lighting components to travel to the incident location and further emit one or more of audible and visible signals. In one embodiment, a drone integrated with a projector may be controlled by the electronic computing device 110 to travel to the incident location and further project a visible signal (e.g., QR code, picture, image, shape or color patterns) directly onto a building or other suitable surface within the field-of-view of non-public-safety agency controlled cameras 140. In response, the non-public-safety agency controlled cameras 140 capture the incident data and further tag the incident data using the visible signal projected onto the building surface by the drone.

At block 360, the electronic computing device 110 links a unique tag representing the emitted signal to the incident identifier associated with the incident detected at block 310. The unique tag includes a representation of the visible and/or audible signal emitted by the public-safety agency controlled IoT infrastructure 120. For example, the unique tag may be a copy of a pre-generated image or text included in the instruction transmitted to the public-safety agency controlled IoT infrastructure to emit a corresponding visible signal. As another example, the unique tag may be an audio file containing the predetermined sequence of audio tones included in the instruction transmitted to the public-safety agency controlled IoT infrastructure 120 to emit a corresponding audible signal. As a further example, the unique tag may be a digital code representing the predetermined sequence of light flashes included in the instruction transmitted to the public-safety controlled IoT infrastructure 120 to emit a corresponding visible signal. Multiple unique tags may be linked to the same incident identifier. For example, a first unique tag may be linked to the incident identifier to represent the pre-generated image or text to be displayed at a first public-safety agency controlled IoT infrastructure 120 (e.g., billboard or a television) deployed at the incident location. A second unique tag may be linked to the same incident identifier to represent the predetermined sequence of light flashes to be emitted by a second public-safety agency controlled IoT infrastructure 120 (e.g., street light) deployed at the same incident location. A third unique tag may be linked to the same incident identifier to represent the predetermined sequence of audio tones to be emitted by a third public-safety agency controlled IoT infrastructure 120 (e.g., loudspeaker) deployed at the same incident location.

In accordance with some embodiments, the electronic computing device 110 stores, at the static memory 216, information linking the unique tag(s) representing the emitted signal to the incident identifier. The electronic computing device 110 may store multiple subsets of unique tags at the static memory 216, where each subset of unique tags may be linked to a different incident identifier. For example, a vehicle collision incident occurring at a first incident location may be associated with a first incident identifier. In this example, a first QR code displayed at a billboard deployed at the first incident location and a first audible signal emitted from a loudspeaker deployed at the first incident location may be both linked to the first incident identifier. As another example, a fire incident occurring at a second incident location may be associated with a second incident identifier. In this example, a second QR code (different from the first QR code) displayed at a billboard deployed at the second incident location and a second audible signal emitted from a loudspeaker deployed at the incident location may be both linked to the second incident identifier. Accordingly, the electronic computing device 110 may link different sets of unique tags to different incidents to allow public-safety agency officers to search incident specific data captured and uploaded on public websites such as social media networks 170 by non-public-safety agency controlled cameras 140.

Next, at block 370, the electronic computing device 110 searches the incident data captured by the non-public-safety agency controlled camera 140 using the unique data representing the emitted signal. In accordance with some embodiments, the non-public-safety agency controlled cameras 140 present at the incident location may capture incident data (e.g., audio, video, or image). The non-public-safety agency controlled cameras 140 may further upload the captured incident data on one or more public websites such as social media networks 170. When the non-public-safety agency controlled cameras 140 capture the audible and/or visible signals emitted by the public-safety agency controlled IoT infrastructures 120 deployed at the incident location, the incident data uploaded on social media networks 170 may be automatically or manually tagged with visible and/or audible signals captured from the public-safety agency controlled IoT infrastructures deployed at the incident location. In accordance with embodiments, public-safety agencies would be able to efficiently search such incident specific data uploaded on social media networks 170 using the unique tag linked to the incident identifier. In one embodiment, the electronic computing device 110 may receive a search query (e.g., from a public-safety agency user or a corresponding device) to search for social media content related to a particular incident. The search query may include the incident identifier associated with the particular incident or other unique information associated with the particular incident. If the search query already includes the incident identifier, the electronic computing device 110 obtains the unique tag or unique tags linked to the incident identifier from the static memory 216. Otherwise, if the search query includes keywords related to incident location, type of incident, officers assigned to the incident etc., the electronic computing device 110 analyzes the keywords to determine one or more incident identifiers that are mapped to the keywords included in the search query. In any case, once the incident identifier is identified from the search query, the electronic computing device 110 obtains the unique tag or unique tags linked to the incident identifier, and responsively searches publicly accessible social media content on one or more social media networks 170 to retrieve one or more social media posts to which the unique tag or unique tags linked to the incident identifier are tagged. In accordance with some embodiments, the electronic computing device 110 may process the social media content using audio, image, and video recognition algorithms to specifically identify media content that is tagged using audible or and/or visible signals. Next, the electronic computing device 110 provides a visual and/or audio output indicating the retrieved social media posts to which the unique tag or tags are tagged. For example, the electronic computing device 110 may provide search results including audio, image, or video associated with the retrieved social media posts on a corresponding visual and/or audio output device (e.g., a computing device on which the query was input by the user). Additionally, or alternatively, the electronic computing device 110 may upload the audio, image, or video associated with the retrieved social media posts to which the unique tag or tags linked to the incident identifier are tagged to the incident database 160. When audio, image, or video is uploaded to the incident database 160, the audio, image, or video is indexed with the incident identifier to enable public-safety agencies to search for content linked to specifically queried incidents.

Figure 4A:
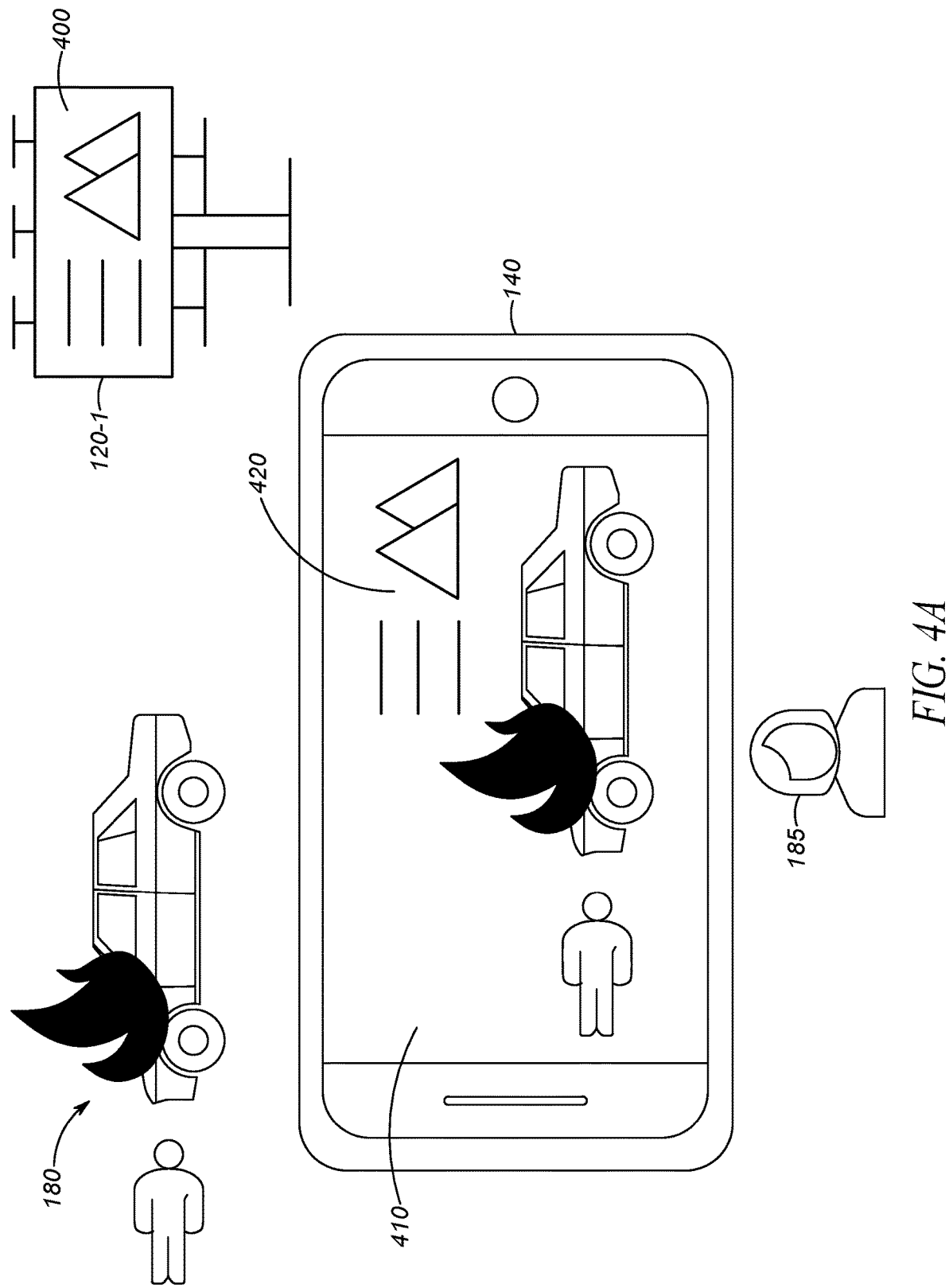
FIGS. 4A through 4D show examples of visible and audible signals emitted by different public-safety agency controlled IoT infrastructures deployed at a particular incident location in accordance with some embodiments.

FIGS. 4A-4D show examples of visible and audible signals emitted by different public-safety agency controlled IoT infrastructures 120 deployed at a particular incident location. In FIG. 4A, an incident scene 180 and a public-safety agency controlled IoT infrastructure 120-1 (e.g., a smart television) deployed near the incident scene 180 are shown. In accordance with the embodiments described herein, the electronic computing device 110 determines that a non-public-safety agency controlled camera 140 (e.g., a smart mobile device) is being operated by a user 185 near the incident scene 180 and further controls the public-safety agency controlled IoT infrastructure 120-1 to emit a visible signal. In the example shown in FIG. 4A, the smart television displays a visible signal including a shape pattern 400 that can be captured by the non-public-safety agency controlled camera 140 along with incident data 410 (e.g., image or video) corresponding to the incident scene 180. A tag 420 corresponding to the shape pattern 400 displayed at the public-safety agency controlled IoT infrastructure 120-1 is embedded to the incident data 410 when the incident data 410 is uploaded from the non-public-safety agency controlled camera to a social media network 170 to enable public-safety agencies to search incident data related to the incident scene 180 using the tag 420.

Figure 4B:
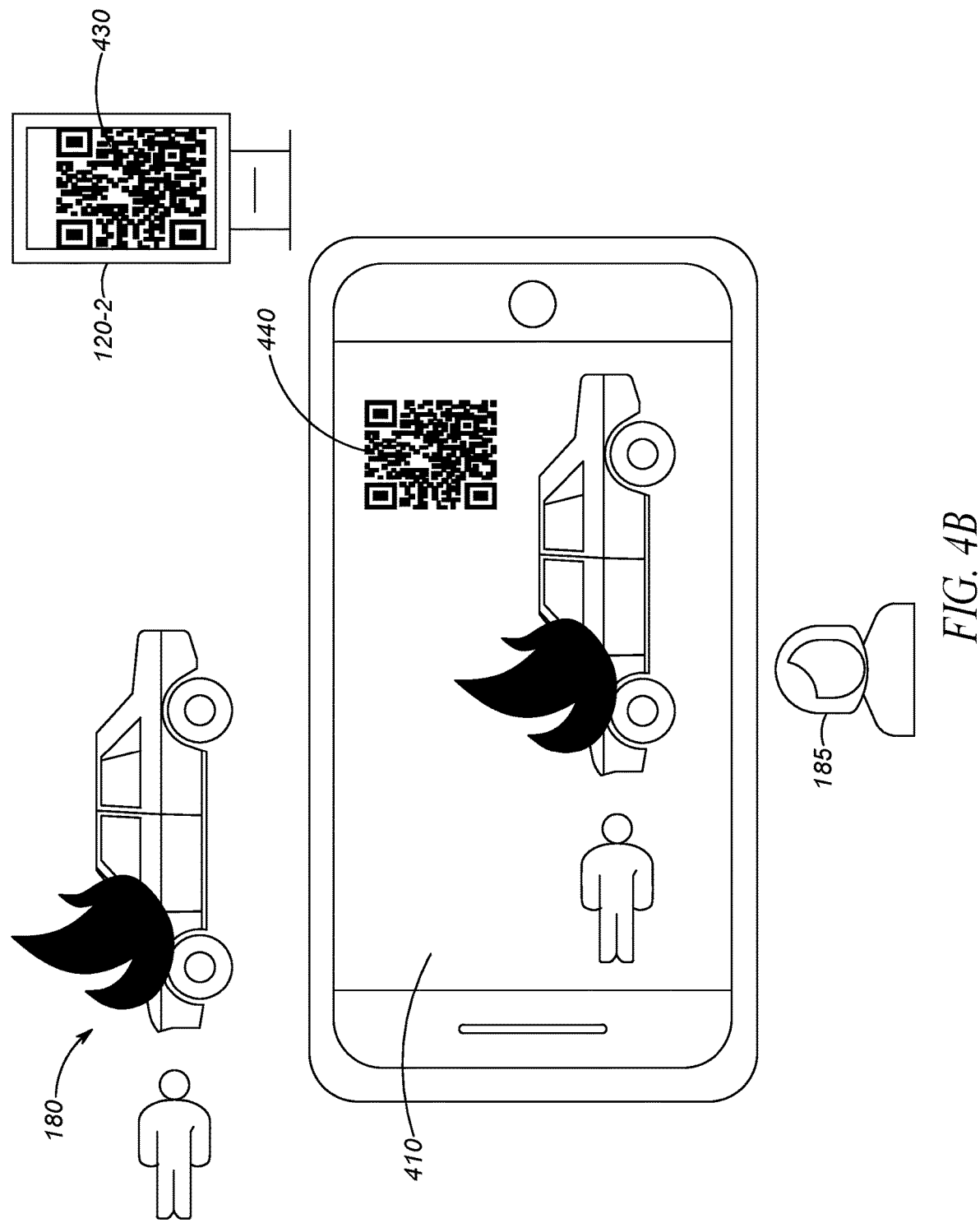

In FIG. 4B, a similar incident scene 180 and a public-safety agency controlled IoT infrastructure 120-2 (e.g., an electronic billboard) deployed near the incident scene 180 are shown. In accordance with the embodiments described herein, the electronic computing device 110 determines that a non-public-safety agency controlled camera 140 (e.g., a smart mobile device) is being operated by a user 185 near the incident scene 180 and further controls the public-safety agency controlled IoT infrastructure 120-2 to emit a visible signal. In the example shown in FIG. 4B, the electronic billboard displays a visible signal including a QR code 430 that can be captured by the non-public-safety agency controlled camera 140 along with incident data 410 (e.g., image or video) corresponding to the incident scene 180. A tag 440 corresponding to the QR code 430 displayed at the public-safety agency controlled IoT infrastructure 120-2 is embedded to the incident data 410 when the incident data 410 is uploaded from the non-public-safety agency controlled camera to a social media network 170 to enable public-safety agencies to search incident data related to the incident scene 180 using the tag 440.

Figure 4C:
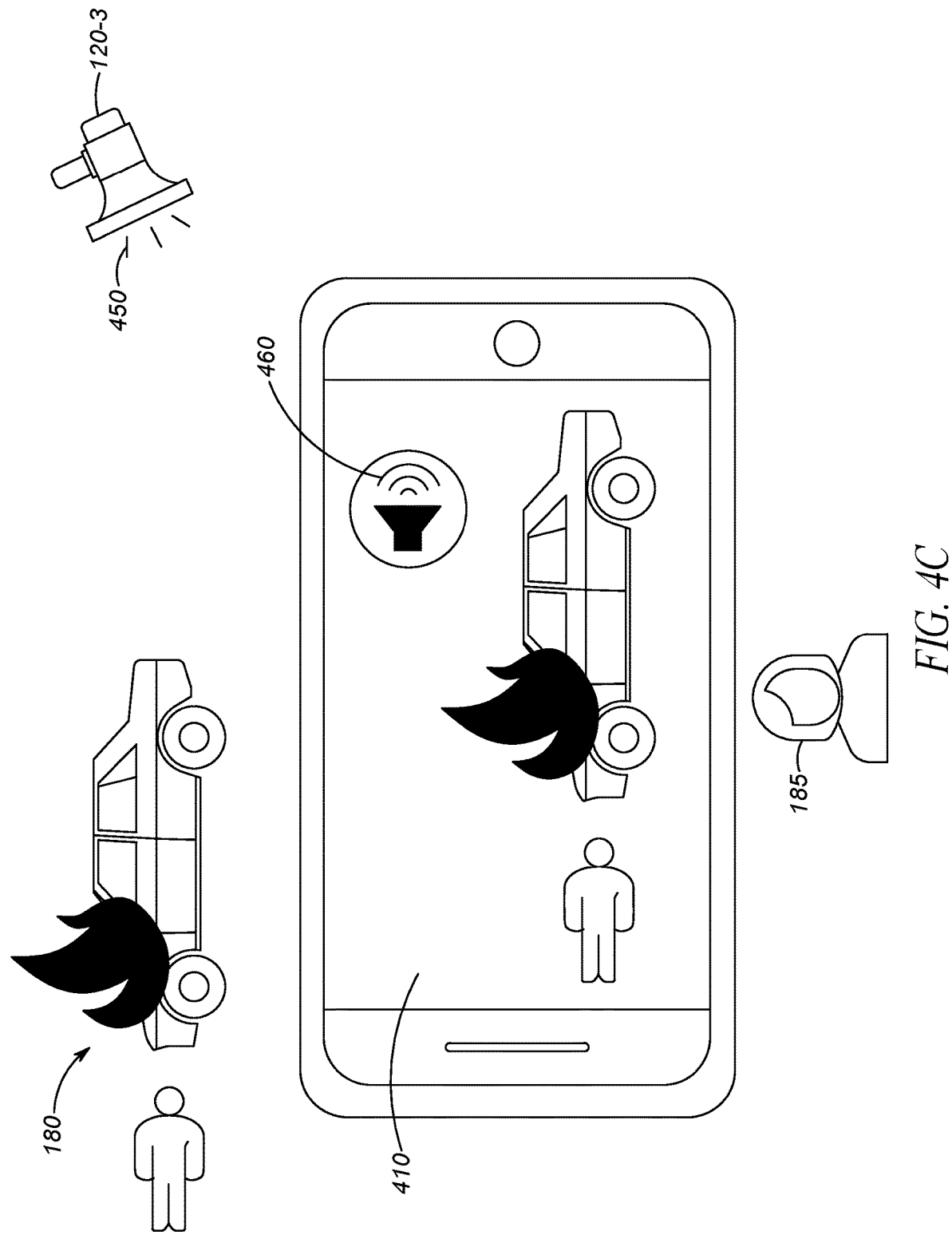

In FIG. 4C, a similar incident scene 180 and a public-safety agency controlled IoT infrastructure 120-3 (e.g., a loudspeaker) deployed near the incident scene 180 are shown. In accordance with the embodiments described herein, the electronic computing device 110 determines that a non-public-safety agency controlled camera 140 (e.g., a smart mobile device) is being operated by the user 185 near the incident scene 180 and further controls the public-safety agency controlled IoT infrastructure 120-3 to emit an audible signal. In the example shown in FIG. 4B, the loudspeaker emits an audible signal including a predetermined sequence of audio tones 450 that can be captured by the non-public-safety agency controlled camera 140 along with incident data 410 (e.g., image or video) corresponding to the incident scene 180. A tag 460 corresponding to the audio tones 450 emitted by the public-safety agency controlled IoT infrastructure 120-3 is embedded to the incident data 410 when the incident data 410 is uploaded from the non-public-safety agency controlled camera 140 to a social media network 170 to enable public-safety agencies to search incident data related to the incident scene 180 using the tag 460.

Figure 4D:
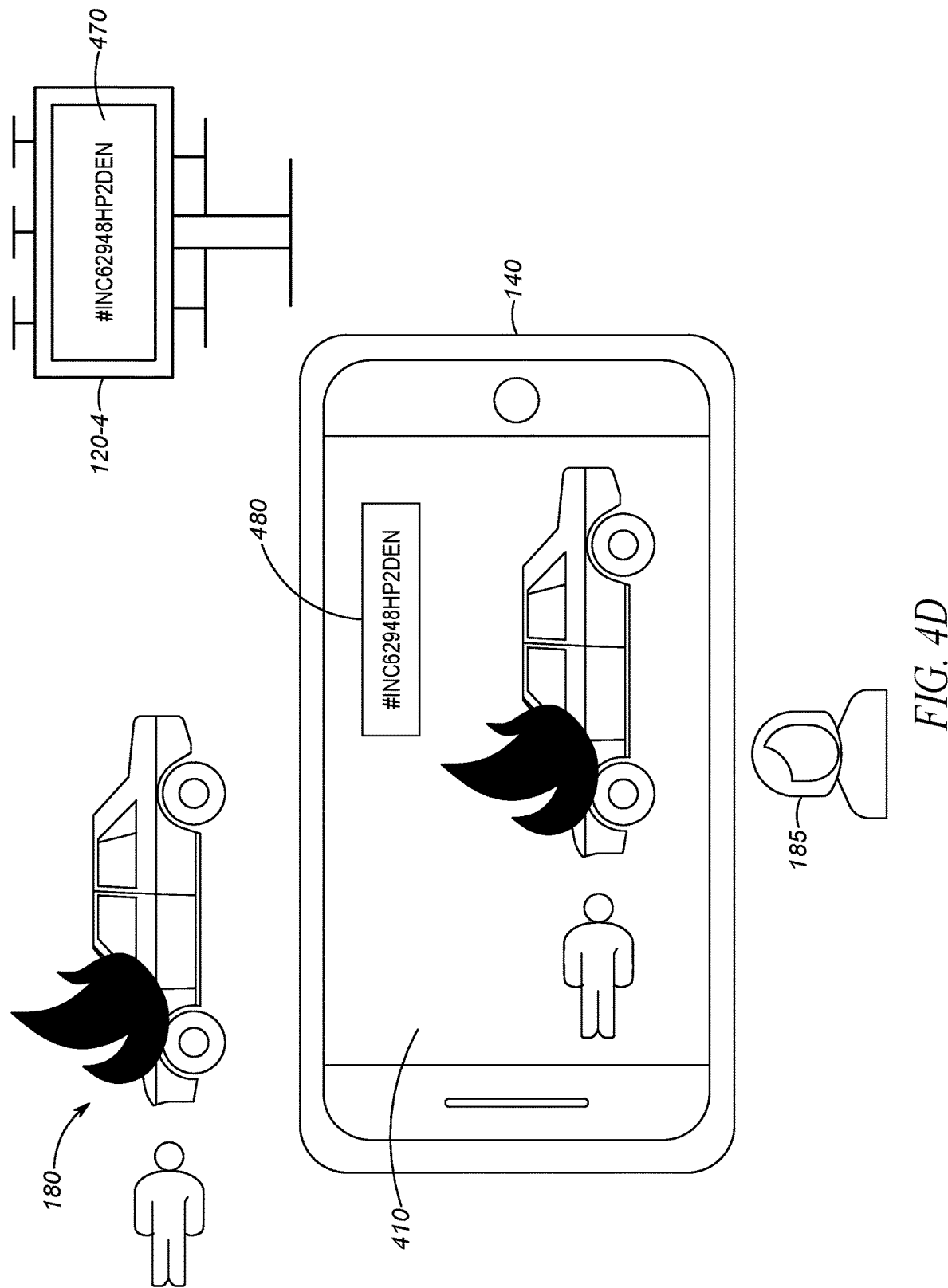

In FIG. 4D, a similar incident scene 180 and a public-safety agency controlled IoT infrastructure 120-4 (e.g., a smart television) deployed near the incident scene 180 are shown. In accordance with the embodiments described herein, the electronic computing device 110 determines that a non-public-safety agency controlled camera 140 (e.g., a smart mobile device) is being operated by a user 185 near the incident scene 180 and further controls the public-safety agency controlled IoT infrastructure 120-4 to emit a visible signal. In the example shown in FIG. 4B, the loudspeaker emits a visible signal including a hashtag 470 that can be captured by the non-public-safety agency controlled camera 140 along with incident data 410 (e.g., image or video) corresponding to the incident scene 180. A tag 480 corresponding to the hashtag 470 displayed at the public-safety agency controlled IoT infrastructure 120-4 is embedded to the incident data 410 when the incident data 410 is uploaded from the non-public-safety agency controlled camera 140 to a social media network 170 to enable public-safety agencies to search incident data related to the incident scene 180 using the tag 480. In one embodiment, the tag 480 is embedded as a watermark to an image captured corresponding to the incident.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of tagging incident data captured by non-public-safety agency controlled cameras, comprising:

detecting, at an electronic computing device, an occurrence of a public-safety incident;

obtaining, at the electronic computing device, an incident identifier associated with the public-safety incident;

determining, at the electronic computing device, whether one or more public-safety agency controlled cameras associated with a public-safety agency are available or capable of capturing, storing, or tagging incident data corresponding to the public-safety incident;

determining, at the electronic computing device, that at least one non-public-safety agency controlled camera is available for capturing incident data corresponding to the public-safety incident only when the one or more public-safety agency controlled cameras associated with the public-safety agency are not available or capable of capturing, storing, or tagging incident data corresponding to the public-safety incident,;

identifying, at the electronic computing device, a public-safety agency controlled internet-of-things (IoT) infrastructure associated with the public-safety agency that is deployed at a location of the public-safety incident;

emitting, at the public-safety agency controlled IoT infrastructure, a signal including one of an audible signal, visible signal, or a combination of audible and visible signals to enable the at least one non-public-safety agency controlled camera to tag incident data captured by the at least one non-public-safety agency controlled camera using the emitted signal;

generating, at the electronic computing device, a unique tag representing the emitted signal;

linking, at the electronic computing device, the unique tag representing the emitted signal to the incident identifier associated with the public-safety incident, and responsively store information linking the unique tag to the incident identifier; and searching, at the electronic computing device, the incident data captured by the at least one non-public-safety agency controlled camera using the unique tag representing the emitted signal.

2. The method of claim 1, wherein determining that the one or more public-safety agency controlled cameras associated with the public-safety agency are not available or capable of capturing, storing, or tagging incident data corresponding to the public-safety incident, comprises one or more of:

determining that the one or more public-safety agency controlled cameras deployed at the location of the public-safety incident has a storage space lower than a predetermined storage space;

determining that the one or more public-safety agency controlled cameras deployed at the location of the public-safety incident has a battery charge level lower than a predetermined battery charge level;

determining that the one or more public-safety agency controlled cameras deployed at the location of the public-safety incident do not have a field-of-view to capture incident data corresponding to the incident; and determining that the one or more public-safety agency controlled cameras deployed at the location of the public-safety incident do not support tagging of captured incident data.

3. The method of claim 1, wherein emitting comprises:

determining a type of the public-safety agency controlled IoT infrastructure;

emitting only an audible signal when the type indicates that the public-safety agency controlled IoT infrastructure is associated only with a speaker component;

emitting only a visible signal when the type indicates that the public-safety agency controlled IoT infrastructure is associated only with a display component or a lighting component; and emitting a combination of audible and visible signals when the type indicates that the public-safety agency controlled IoT infrastructure is associated with the speaker component and one of the display component or the lighting component.

4. The method of claim 3, wherein emitting only an audible signal comprises:

transmitting an instruction from the electronic computing to the public-safety agency controlled IoT infrastructure to emit the audible signal including a predetermined sequence of audio tones via the speaker component, the instruction further including commands for controlling a predetermined set of audio parameters for emitting the audible signal including the predetermined sequence of audio tones.

5. The method of claim 3, wherein emitting only a visible signal comprises:

transmitting an instruction from the electronic computing device to the public-safety agency controlled IoT infrastructure to emit the visible signal including a predetermined sequence of light flashes via the lighting component, the instruction including commands for controlling a predetermined set of lighting parameters for emitting the visible signal including the predetermined sequence of light flashes.

6. The method of claim 3, wherein emitting only a visible signal comprises:
transmitting an instruction from the electronic computing device to the public-safety agency controlled IoT infrastructure to emit the visible signal by displaying a pre-generated image or text via the display component, the instruction including the pre-generated image or text.

7. The method of claim 3, wherein emitting a combination of audible and visible signals comprises:
transmitting an instruction from the electronic computing device to the public-safety agency controlled IoT infrastructure to emit the audible signal including a predetermined sequence of audio tones via the speaker component and the visible signal including a predetermined sequence of light flashes via the lighting component or by displaying a pre-generated image or text via the display component, the instruction further including a first set of commands for controlling a predetermined set of audio parameters and a second set of commands for controlling a predetermined set of lighting parameters or the pre-generated image or text.

8. The method of claim 1, wherein the public-safety agency controlled IoT infrastructure is selected from the group consisting of electronic billboards, traffic signals, street lights, smart televisions, projectors, and loudspeakers.

9. The method of claim 1, wherein searching the incident data comprises:
receiving a search query to search for social media content related to the public-safety incident, the search query including the incident identifier associated with the public-safety incident;
obtaining the unique tag that is linked to the incident identifier included in the search query, and responsively searching social media content on one or more social media networks to retrieve a social media post to which the unique tag linked to the incident identifier is tagged; and
one of (i) providing a visual and/or audio output indicating the retrieved social media post to which the unique tag is tagged, and (ii) uploading the retrieved social media post to which the unique tag linked to the incident identifier is tagged to an incident database.

10. An electronic computing device, comprising:
a transceiver; and
an electronic processor communicatively coupled to the transceiver, wherein the electronic processor is configured to:
detect an occurrence of a public-safety incident;
obtain an incident identifier associated with the public-safety incident;
determine whether one or more public-safety agency controlled cameras associated with a public-safety agency are available or capable of capturing, storing, or gagging incident data corresponding to the public-safety incident;
determine that at least one non-public-safety agency controlled camera associated with a non-public-safety agency is available for capturing incident data corresponding to the public-safety incident only when the one or more public-safety agency controlled cameras associated with the public-safety agency are not available or capable of capturing, storing, or tagging incident data corresponding to the public-safety incident,;
identify a public-safety agency controlled internet-of-things (IoT) infrastructure associated with the public-safety agency that is deployed at a location of the public-safety incident;
emit, at the public-safety agency controlled IoT infrastructure, a signal including one of an audible signal, visible signal, or a combination of audible and visible signals to enable the at least one non-public-safety agency controlled camera to tag incident data captured by the at least one non-public-safety agency controlled camera using the emitted signal;
generate a unique tag representing the emitted signal;
link the unique tag representing the emitted signal to the incident identifier associated with the public-safety incident, and responsively store information linking the unique tag to the incident identifier; and
search the incident data captured by the at least one non-public-safety agency controlled camera using the unique tag representing the emitted signal.

11. The electronic computing device of claim 10, wherein the electronic computing device is configured to determine that the one or more public-safety agency controlled cameras associated with the non-public-safety agency are not available or capable of capturing, storing, or tagging incident data corresponding to the public-safety incident when the one or more public-safety agency controlled cameras deployed at the location of the public-safety incident has a storage space lower than a predetermined storage space, has a battery charge level lower than a predetermined battery charge level, do not have a field-of-view to capture incident data corresponding to the public-safety incident, or do not support tagging of captured incident data.

12. The electronic computing device of claim 10, wherein the electronic processor is configured to:
determine a type of the public-safety agency controlled IoT infrastructure associated with the public-safety agency;
emit, at the public-safety agency controlled IoT infrastructure, only an audible signal when the type indicates that the public-safety agency controlled IoT infrastructure is associated only with a speaker component;
emit, at the public-safety agency controlled IoT infrastructure, only a visible signal when the type indicates that the public-safety agency controlled IoT infrastructure is associated only with a display component or a lighting component; and
emit, at the public-safety controlled IoT infrastructure, a combination of audible and visible signals when the type indicates that the public-safety agency controlled IoT infrastructure is associated with the speaker component and one of the display or the lighting component.

13. The electronic computing device of claim 12, wherein the electronic processor is configured to transmit, via the transceiver, an instruction to the public-safety agency controlled IoT infrastructure to emit the audible signal including a predetermined sequence of audio tones via the speaker component, wherein the instruction includes commands for controlling a predetermined set of audio parameters for emitting the audible signal including the predetermined sequence of audio tones.

14. The electronic computing device of claim 12, wherein the electronic processor is configured to transmit, via the transceiver, an instruction to the public-safety agency controlled IoT infrastructure to emit the visible signal including a predetermined sequence of light flashes via the lighting component, wherein the instruction includes commands for controlling a predetermined set of lighting parameters for emitting the visible signal including the predetermined sequence of light flashes.

15. The electronic computing device of claim 12, wherein the electronic processor is configured to transmit, via the transceiver, an instruction to the public-safety agency controlled IoT infrastructure to emit the visible signal by displaying a pre-generated image or text via the display component, wherein the instruction includes the pre-generated image or text.

16. The electronic computing device of claim 12, wherein the electronic processor is configured to transmit, via the transceiver, an instruction to the public-safety agency controlled IoT infrastructure to emit the audible signal including a predetermined sequence of audio tones via the speaker component and the visible signal including a predetermined sequence of light flashes via the lighting component or by displaying a pre-generated image or text via the display component, wherein the instruction includes a first set of commands for controlling a predetermined set of audio parameters and a second set of commands for controlling a predetermined set of lighting parameters or the pre-generated image or text.

17. The electronic computing device of claim 10, wherein the public-safety agency controlled IoT infrastructure is selected from the group consisting of electronic billboards, traffic signals, street lights, smart televisions, projectors, and loudspeakers.

18. The electronic computing device of claim 10, wherein the electronic computing device is configured to:
receive a search query to search for social media content related to the public-safety incident, the search query including the incident identifier associated with the public-safety incident;
obtain the unique tag that is linked to the incident identifier included in the search query, and responsively search social media content on one or more social media networks to retrieve a social media post to which the unique tag linked to the incident identifier is tagged; and
one of (i) provide a visual and/or audio output indicating the retrieved social media post to which the unique tag is tagged, and (ii) upload the retrieved social media post to which the unique tag linked to the incident identifier is tagged to an incident database.

\* \* \* \* \*